US012808741B2

(12) United States Patent
Elcock et al.

(10) Patent No.: US 12,808,741 B2
(45) Date of Patent: Nov. 24, 2026

(54) FORCE-DEFLECTION BASED LEAK DETECTION FOR MOBILE DEVICE

(71) Applicant: Communications Test Design, Inc., West Chester, PA (US)

(72) Inventors: Albert Elcock, West Chester, PA (US); Christopher Mandeen, West Chester, PA (US); Ryan Smith, Phoenixville, PA (US); Phillip Cronauer, West Chester, PA (US); Kartik Patel, West Chester, PA (US); Robel Tadele, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 318 days.

(21) Appl. No.: 18/438,909

(22) Filed: Feb. 12, 2024

(65) Prior Publication Data

US 2025/0258056 A1 Aug. 14, 2025

(51) Int. Cl.
*G01M 3/00* (2006.01)

(52) U.S. Cl.
CPC .................................... *G01M 3/00* (2013.01)

(58) Field of Classification Search
CPC ...................................................... G01M 3/00
See application file for complete search history.

(56) References Cited

U.S. PATENT DOCUMENTS

| | | | | |
|---|---|---|---|---|
| 9,297,467 | B1 * | 3/2016 | Goseco | F16K 17/36 |
| 2016/0150334 | A1 * | 5/2016 | Lin | H04R 29/001 381/59 |
| 2017/0038905 | A1 * | 2/2017 | Bijamov | G06F 3/0414 |
| 2018/0128708 | A1 * | 5/2018 | Cirino | G01M 3/363 |
| 2018/0364850 | A1 * | 12/2018 | Vosgueritchian | G06F 3/0416 |
| 2019/0041291 | A1 | 2/2019 | Bialik et al. | |
| 2019/0138125 | A1 * | 5/2019 | Zeng | G06F 3/044 |
| 2021/0110440 | A1 | 4/2021 | Dion et al. | |
| 2022/0122243 | A1 | 4/2022 | Fitzgerald et al. | |
| 2025/0139761 | A1 * | 5/2025 | Mandeen | G06T 7/70 |

OTHER PUBLICATIONS

International Search Report and Written Opinion for PCT International Application No. PCT/US2025/013228 dated Apr. 4, 2025, 11 pages.
Kim, et al. "Universal Testing Apparatus Implementing Various Repetitive Mechanical Deformations to Evaluate the Reliability of Flexible Electronic Devices." Micromachines, 2018.
Yu, et al. "Water-Resistant Smartphone Technologies." IEEE Access, 2019.

* cited by examiner

*Primary Examiner* — Eric S. McCall
(74) *Attorney, Agent, or Firm* — Duane Morris LLP

(57) ABSTRACT

A system of evaluating a mobile device includes a sensing device that captures data while a force is being applied to a display of the mobile device while the mobile device is held stationary; and a processing device to process the data and determine the force applied and a displacement of the display while the force is being applied.

11 Claims, 5 Drawing Sheets

FORCE-DEFLECTION BASED LEAK DETECTION FOR MOBILE DEVICE

BACKGROUND

The present disclosure relates to systems and methods of evaluating a mobile device. More specifically, the present disclosure relates to providing a mechanical force to an electronic display of a mobile device to evaluate environmental sealing of the mobile device.

Mobile devices, including tablets, smartphones, smartwatches, etc. have become sophisticated, widespread, and pervasive. With the increasing usage of computer network services all over the world, these mobile devices are in great demand. As a result, the cost of returned, used, and refurbished mobile devices has increased. As with any used mobile device, the mobile device should be evaluated, refurbished, and graded prior to being available again in the stream of commerce.

Potential failure mechanisms of mobile devices include problems with sealing of the electronic display within the frame or housing of the mobile device. Typically, the electronic display in a mobile device is a liquid crystal display (LCD) or an organic light-emitting diode (OLED) display. These display types include several stacked material layers. The material layers can include a separate or integrated touch screen along with the electronic display and an outermost protective layer. The outermost protective layer is typically glass and is used for mechanical and environmental protection and sealing of the electronic display and internal mobile device components. Additionally, there is an environmental seal between the outer edge of the electronic display and the frame or housing of the mobile device. The environmental seal can be defined, for example, as a gasket or sealant.

Besides the obvious problems of cracks, visual impairment, dim and non-uniform lighting, etc., failure mechanisms of displays in mobile devices can include non-obvious delaminating, and mechanical shifting or lifting from the frame that causes an undesired leak through the environmental seal to the mobile device interior.

Conventional systems used for leak testing mobile devices use positive or negative air pressure and correspond pressure changes to test parameters to determine of the environmental seal of the mobile device is leaking. The space around a mobile device can be pressurized and a sensor used to measure deflection of the display over a period of time. Alternatively, negative air pressure can be applied via an opening to the interior of the mobile device such a connector port or SIM card slot and the pressure measured over a period of time. However, a pressurized air or vacuum system is required to be used in these systems. The positively pressurized system requires that the mobile device be placed into a pressurized chamber. Both air pressure systems require taping or sealing some of the ports or air passage ways of the mobile device and are difficult to automate. A simpler more elegant system that can be automated to detect a leak in mobile devices is needed.

SUMMARY OF THE DISCLOSURE

The exemplary embodiments disclosed herein are directed to solving the issues relating to one or more of the problems presented in the prior art, as well as providing additional features that will become readily apparent by reference to the following detailed description when taken in conjunction with the accompanying drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

To overcome the problems described above, embodiments of the present disclosure describe a diagnostic tool for evaluating mobile devices. The disclosed diagnostic tool is mechanical in nature and characterizes the deflection of the electronic display ("the display") when a physical force is applied to the outer surface while the display is in the mobile device. This tool creates a graph showing the displacement of the screen as the force increases over time for the duration of the test that can be analyzed by the user or an automated system and used to determine whether the mobile device is sealed properly and next steps for processing a failed mobile device.

According to an embodiment, a system of evaluating a mobile device includes a sensing device that captures data while a force is being applied to a display of the mobile device while the mobile device is held stationary; and a processing device to process the data and determine the force applied and a displacement of the display while the force is being applied.

The system can further include a pressing device that applies the force perpendicular to an outer surface of the display. In an aspect, the pressing device is a linear motor.

In an aspect, the sensor captures data while the display is being displaced.

In an aspect, the processing device presents processed data as a graph of the force applied versus displacement of the display while the force is being applied.

In an aspect, the processing device compares processed data to predetermined values that represent pass/failure criteria of the mobile device.

In an aspect, a comparison of the difference in distance to the predetermined value determines if the display has shifted an unacceptable amount with respect to the frame.

In another embodiment, a system captures data of a force applied to a display of a mobile device and displacement of the display while the force is applied and processes the data to determine if an environmental seal of the mobile device is leaking.

In another embodiment, a method of evaluating an environmental seal of a mobile device captures data of a force applied to a display of the mobile device and displacement of the display while the force is applied and processes the data to determine if the mobile device is leaking.

In another embodiment, a linear motor applies the force in a direction perpendicular to an outer surface of the display.

In another embodiment, a computer system in communication with the linear motor process the data.

In another embodiment, the processing the data includes plotting the force applied versus the displacement.

In another embodiment, the processing the data further includes comparing a slope of a curve of the force applied versus the displacement to a predetermined value.

In another embodiment, the processing the data includes calculating at least one of offset, deflection, and compression, and feeding at least one of calculated offset, deflection, and compression values into a machine learning model.

In another embodiment, the method further includes training a machine learning model using known good and known failed mobile devices.

In another embodiment, a non-transitory computer-readable medium includes executable instructions that when executed by a processor causes the processor to capture force data and process the force data to determine if an environmental seal of a mobile device is leaking.

In an aspect, the force data is captured from a linear motor while the linear motor is pressing perpendicularly against an outer surface of a display of the mobile device.

In an aspect, the force data is captured while a force is being applied to a display of the mobile device, and processing the force data includes plotting the force data versus displacement of the display while the force is being applied.

In an aspect, the processing the force data further includes calculating at least one of offset, deflection, and compression, and feeding at least one of calculated offset, deflection, and compression values into a machine learning model.

The above and other features, elements, characteristics, steps, and advantages of the present invention will become more apparent from the following detailed description of preferred embodiments of the present invention with reference to the attached drawings.

DETAILED DESCRIPTION

Figure 1:
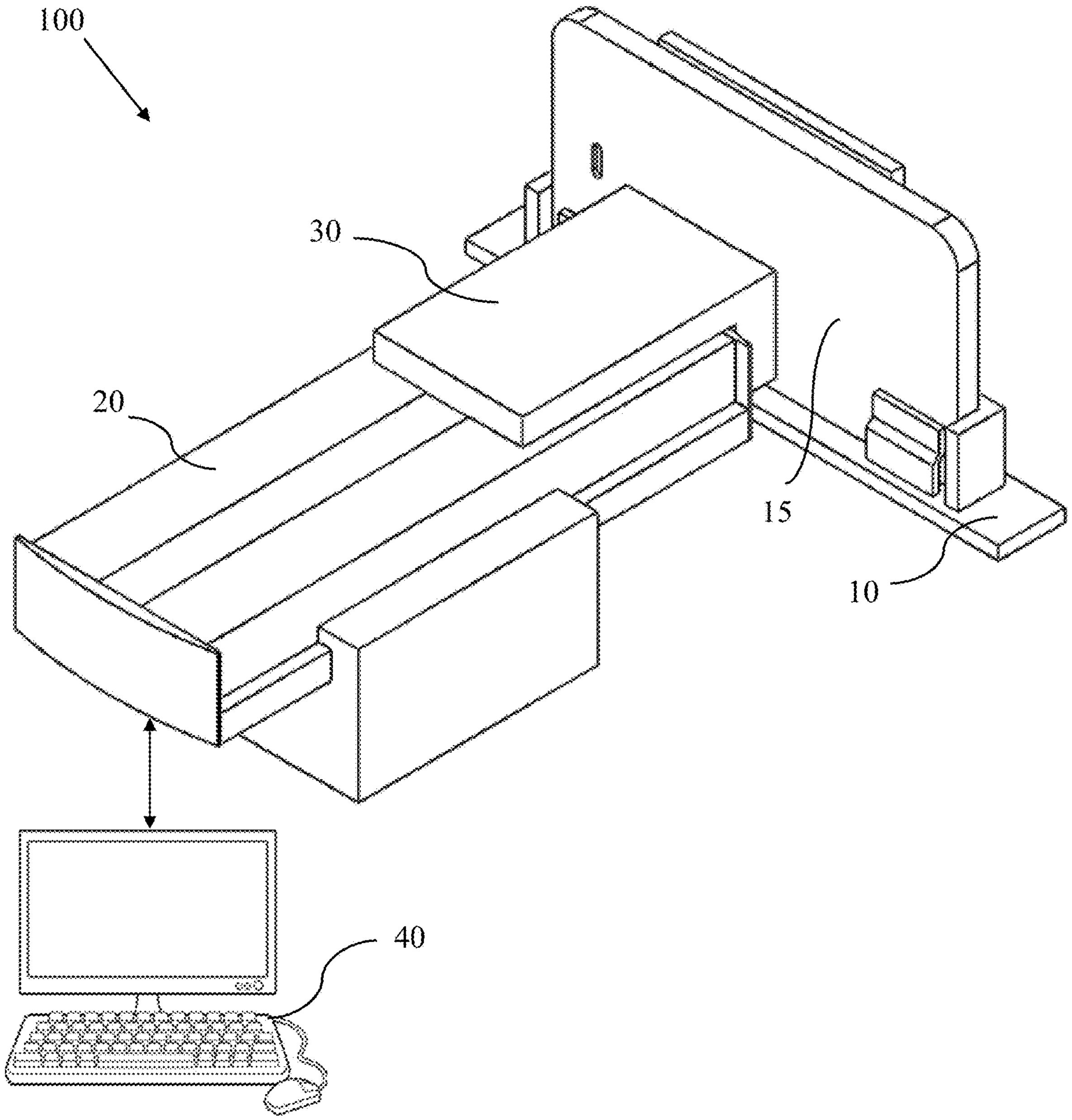
FIG. 1 is a diagram of a leak detection system, according to an embodiment of the present disclosure.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Electronic displays of mobile devices are sealed in their frame or housing during manufacture. The seal is provided completely around the outside perimeter of the electronic display in an area where the electronic display meets the frame. This seal between the electronic display and the frame provides environmental integrity in that it prevents air and liquids from migrating between the ambient environment and the inside of the mobile device, which includes the battery and electronic components, around the perimeter of the electronic display. Sealing the mobile device creates a static air pocket within the mobile device. Undesirable air or liquid migration can allow moisture and other contaminates to penetrate the inside of the mobile device and cause or contribute to failures of the battery, electronics, or internal wiring.

It has been found that displays in mobile devices can physically shift from their manufactured position in their frame during handling and use. This physical shift can be caused by exposure to shock, vibration, temperature changes, other environmental factors, or a combination of such environments. Such a shift can weaken and/or break the environmental seal between the display and the frame to allow air migration and/or liquid penetration into the mobile device, which is a failure mode. It is also possible that the environment seal was not installed properly and/or the seal material degraded over time.

The present disclosure describes a diagnostic tool for evaluating mobile devices. The disclosed diagnostic tool applies a force to an outer surface of the display of a mobile device and records a value of the force applied and/or displacement of the display while the force is being applied.

The problem being solved is the testing whether the environmental seal between the glass of the display and frame of a mobile device is effective. The testing focuses on the deflection of the glass surface of the display when a physical force is applied to detect whether the mobile device is sealed properly. Deflection of the display applies pressure to the air pocket within the mobile device. A higher than expected deflection of the display for a given force and/or a lesser force required to provide an expected deflection of the display is an indication that the air pocket is not reacting as expected and is leaking. A leaking air pocket inside the mobile device means that air is moving through the environmental seal, i.e., the environmental seal has been breached. The disclosed test system gathers data for force applied and display deflection and creates a graph of the force/deflection created during a test. With this information, it can be determined if the environment seal around the display is leaking. The data can be analyzed by the user or automatically compared to predetermined values by a computer system to determine if a mobile device under test has passed the test, is sealed properly, and next steps for a failed mobile device.

FIG. 1 illustrates an exemplary leak detection system 100 for evaluating a mobile device 15, according to an embodiment of the present disclosure. As shown, the system 100 can include a fixture 10 in which to secure the mobile device 15, a motor 20, an attachment 30 mounted to the motor 20, and a computer system 40 in electronic communication with the motor 20.

The fixture 10 can secure the mobile device 15 in a manner such that the mobile device 15 is substantially perpendicular to a pressing surface of the attachment 30. The fixture 10 is configured to permit the attachment 30, forced by the motor 20, to press against an outer surface of the display of the mobile device 15 and measure deflection of the display while restricting movement of the remainder of mobile device 15.

The motor 20 can be a linear motor that produces a linear force along its length and controlled by a controller. The controller can be a separate device or a portion of and/or integrated with the computer system 40 that is used to operate and control the motor 20. The motor 20 can be any suitable motor or pressing device that can apply and record force and/or displacement within suitable parameters. Alternatively, any suitable motor or pressing device can be combined with an external sensor or sensors.

The attachment 30 can be a separate structure or fixture that can be removably attached to the motor 20 using any suitable means or mechanism. The attachment 30 can serve as an interface or buffer between a moving portion of the motor 20 and the outer surface of the display. A pressing surface of the attachment 30 that is meant to press against the display can be rigid and non-compressible, and sized and shaped to any suitable configuration and be such that it should not scratch or otherwise cause damage to the display.

In some embodiments, the pressing surface of the attachment 30 can have a round shape or a rectangular shape. For example, the pressing surface can be square. The dimensions of a pressing surface can be within a range of about 6 mm to 15 mm by 6 mm to 15 mm, within manufacturing tolerances. In an embodiment, the pressing surface can be about 9 mm by 9 mm, within manufacturing tolerances. In another embodiment, the pressing surface can be about 12 mm by 12 mm, within manufacturing tolerances Different size pressing surfaces and attachments 30 can be used as suitable to correspond with different mobile devices 15.

The computer system 40 can include known computing components, such as one or more processors, one or more memory devices storing software instructions executed by the processor(s), an operator interface including a keyboard, mouse, and monitor, and data stored in a memory. The computer system 40 can include the controller that controls the motor 20. Stored software instructions can include a program or an application for operating the system along with a graphic user interface (GUI) to assist an operator. The one or more processors can be a single microprocessor or multiple microprocessors, field programmable gate arrays (FPGAs), digital signal processors (DSPs), a network, or any suitable combination of these or other components capable of executing particular sets of instructions. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), a semiconductor memory, or the cloud. The computer system 40 can include a server or network of computers. The computer system 40 can include an output device such as a printer and a monitor.

The computer system 40 can include test application programmed to control, capture, store, process, and display raw and/or processed data from the motor 20. The data can be presented in a graphical form and track positions on that graph. The computer system 40 can create a graph of force applied to a display versus displacement of the display while the force is being applied during a test. The deflection of the display over the duration of the test or slope of a curve on that graph can be used to determine whether a mobile device passes or fails the test. A process for determining whether a mobile device passes or fails the test can include comparing a measured deflection of the display and/or a slope of the graph to predetermined values. In some embodiments, the test application can include a machine learning model used to determine whether a mobile device passes or fails the test. The predetermined values can be established by evaluating data from known good (i.e. "golden") devices and also known failed devices to indicate if the environmental seal of the mobile device is leaking.

Figure 2:
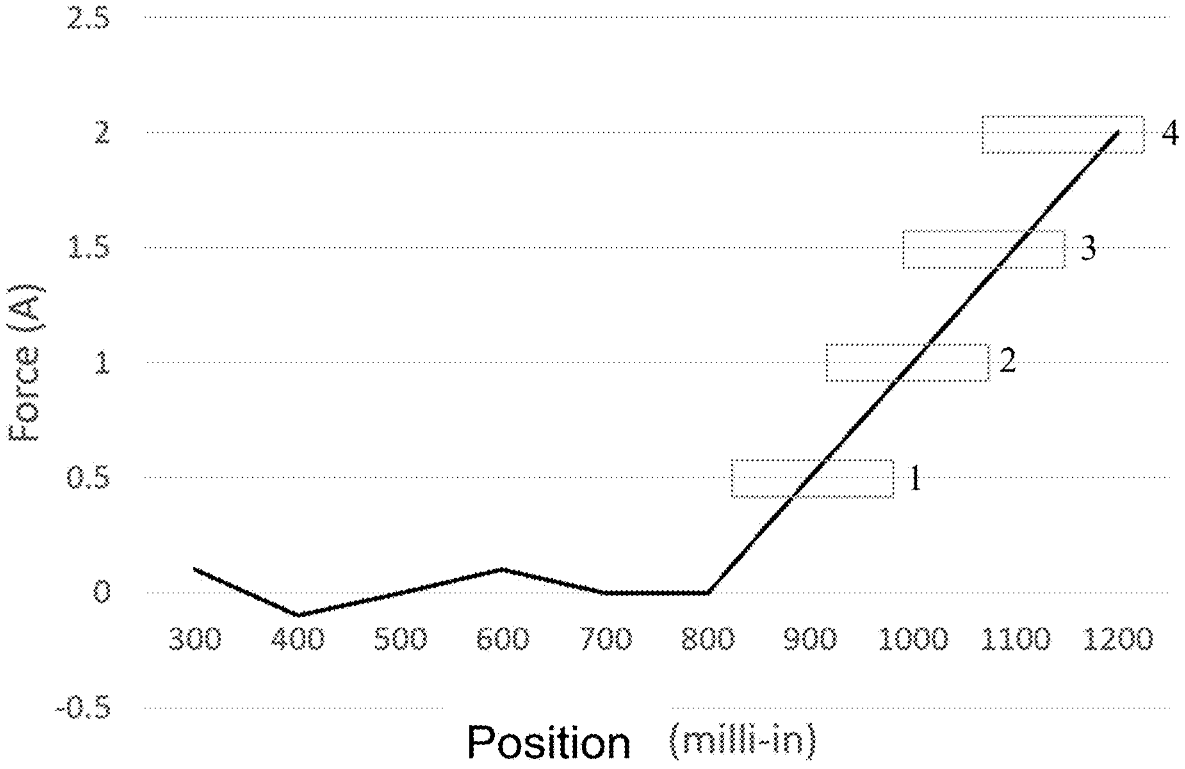
FIG. 2 and FIG. 3 are graphs showing examples of processed data, according to an embodiment of the present disclosure.
Figure 3:
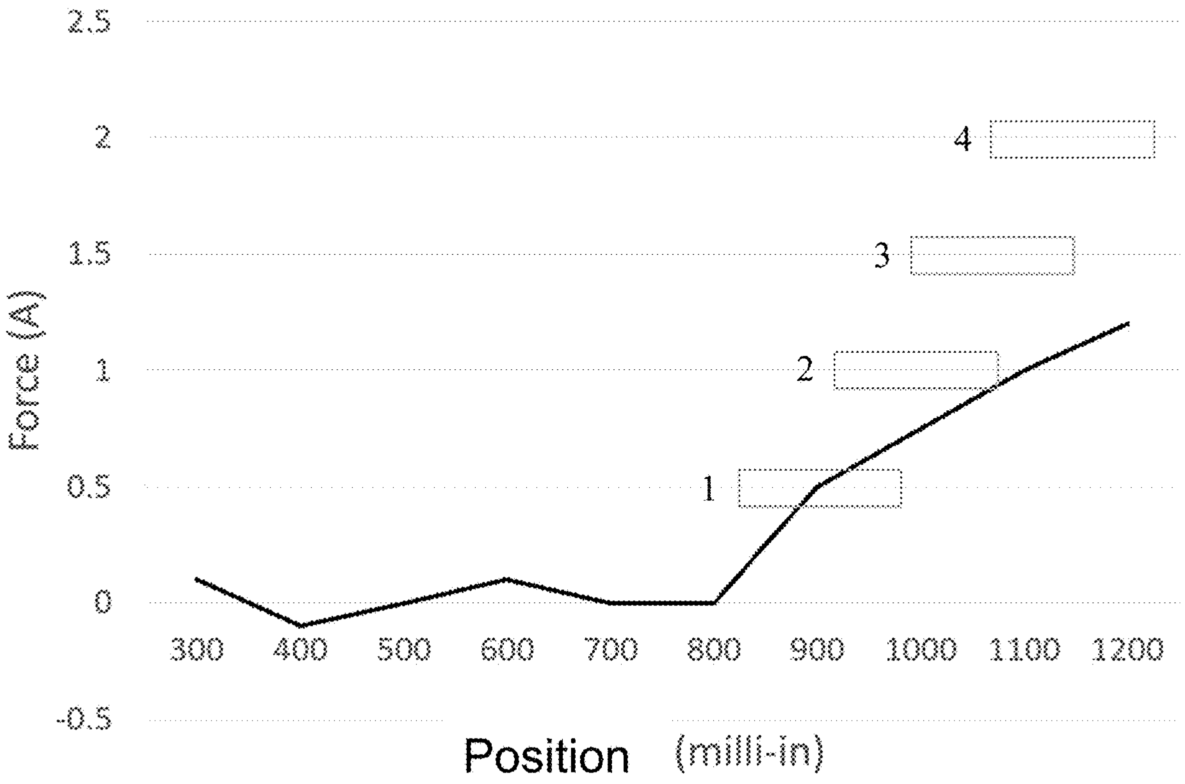

For example, FIGS. 2 and 3 show graphs of how data can be presented. FIGS. 2 and 3 include curves of data taken by the leak detection system 100 and formatted and presented by the computer system 40 in an embodiment. FIGS. 2 and 3 plot a relative position of the motor 20 along the X-axis in milli-inches (milli-in) and force that the motor 20 is applying to the outer surface of the display of a mobile device along the Y-axis in amps (A), where 100 mA equals 1 N. As seen in FIGS. 2 and 3 the force of the motor 20 generally increases as the motor 20 translates into the display.

FIG. 2 shows exemplary test data plotted during leak testing of a mobile device that has a calculated deflection of about 300 milli-in after the motor began to apply a force to the display with a slope that corresponds with what would be classified as passing the test. That is, the force-deflection curve passes through boxes 1-4. The boxes have been predetermined to correspond to data taken of mobile devices that were not leaking. The deflection is calculated from the raw motor data as where the motor drive ends minus a sector offset. For FIG. 2, that is 64182 (drive end)−63843 (sector offset)=348 (distance).

FIG. 3 shows exemplary test data plotted during leak testing of a mobile device that has a calculated deflection of about 600 milli-in (64415 (drive end)−63819 (sector offset) =596 (distance)) which is higher than desired and has a lesser slope than the curve of FIG. 2 and that does not correspond with what would be classified as a passed unit. That is, the curve in FIG. 3 passes through only box 1 but not boxes 2-4. As such the curve shows that the display deflects more than desired for certain forces applied indicating that air is being pushed out of the interior of the mobile device through a leaking seal.

Alternatively, the data from the motor 20 could also be interpreted non graphically and have a minimum force requirement per displacement in the data evaluation. Alternatively, the data from the motor 20 could also be interpreted non graphically and pass/fail criterion could also be evaluated by measuring the total deflection of the display. Alternatively, the data from the motor 20 could also be interpreted non graphically and pass/fail criterion could also be evaluated by measuring the differences in total deflection, start/end positions of the motor 20, slope across a single or multiple tests, and other test parameters. Results of the test can be interpreted manually by an operator or automatically by the computer system 40.

Figure 4:
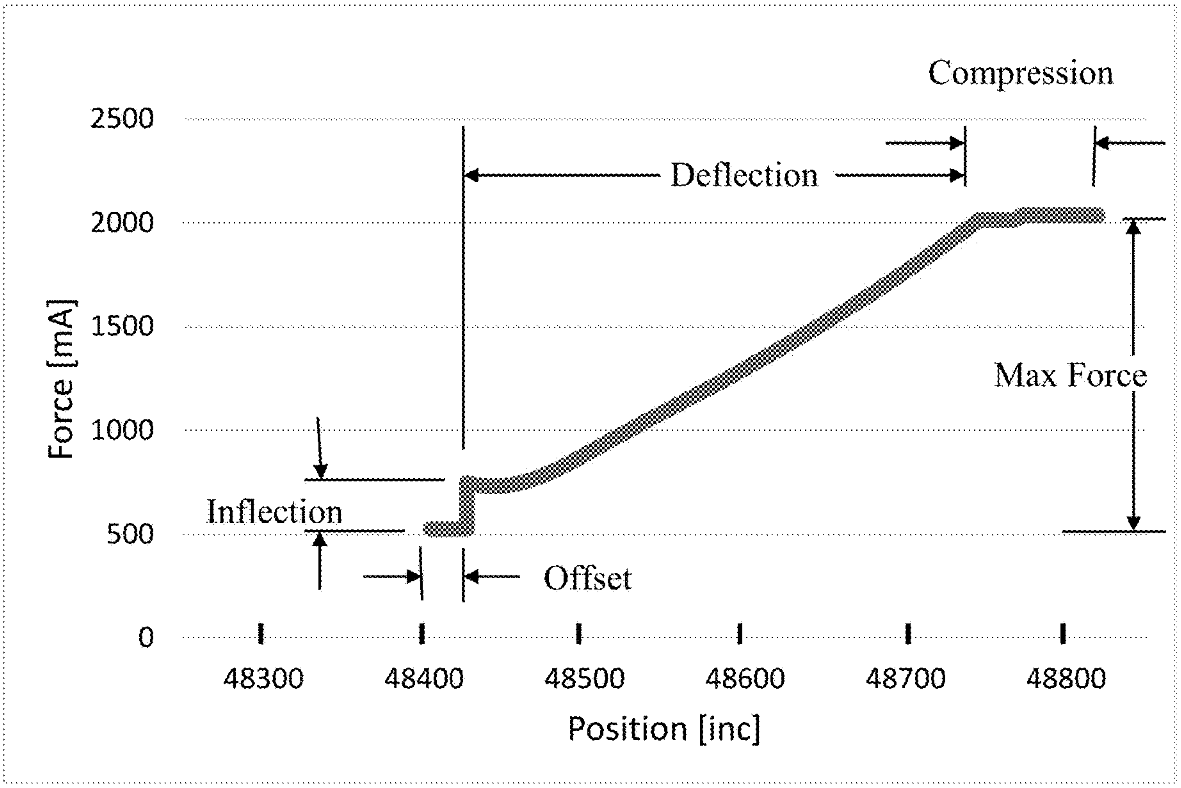
FIG. 4 is a graph showing an example of processed data, according to another embodiment of the present disclosure.

In some embodiments, force/deflection data can be interpreted using a trained machine learning (ML) model in the test application running on the computer system 40. The ML model can be trained with multiple known good and bad mobile devices to build cluster statistics. FIG. 4 is a graph showing an example of a force-position curve and processed data, according to an embodiment with a ML model. The ML model can include several input parameters for training. For example, inputs to the ML model can include mobile device type (based on the volume of air inside a sealed mobile device) and thickness of the front glass of the display in the mobile device. Other exemplary additional input parameters for training are indicated in FIG. 4. Additionally, other parameters can be input and factored in the ML model including, but not limited to, slope, velocity of the motor anywhere along the force-position curve, force of the motor anywhere along the force-position curve, duration of compression, area of the pressing surface, shape of the pressing surface, position lagging (this is the distance from a point on the deflection curve when the motor is extending to a point when the motor is retracting at a given force), duration of deflection, and barometric pressure.

Offset is the distance the actuator of the motor 20 travels from a start position to reaching a point where an inflection force is detected after the pressing surface makes contact with the front surface of the display in the mobile device under test. The inflection force can be predetermined from experimentation to ensure that the pressing surface has made contact with the display. For example, the inflection force can be in the range of 0.5 N to 10 N. In one embodiment, the inflection force can be 1 N. In another embodiment, the inflection force can be 5 N.

Deflection is the amount that the display deflects until a maximum force has been reached. The maximum force can be predetermined by experimentation and be a force that does not increase with increased deflection of the display before cracking the display. For example, the maximum force can be in the range of 10 N to 30 N. In an embodiment, the maximum force can be 20 N. Compression is the amount that the display deflects after the maximum force has been reached and until the pressing force is removed.

Figure 5:
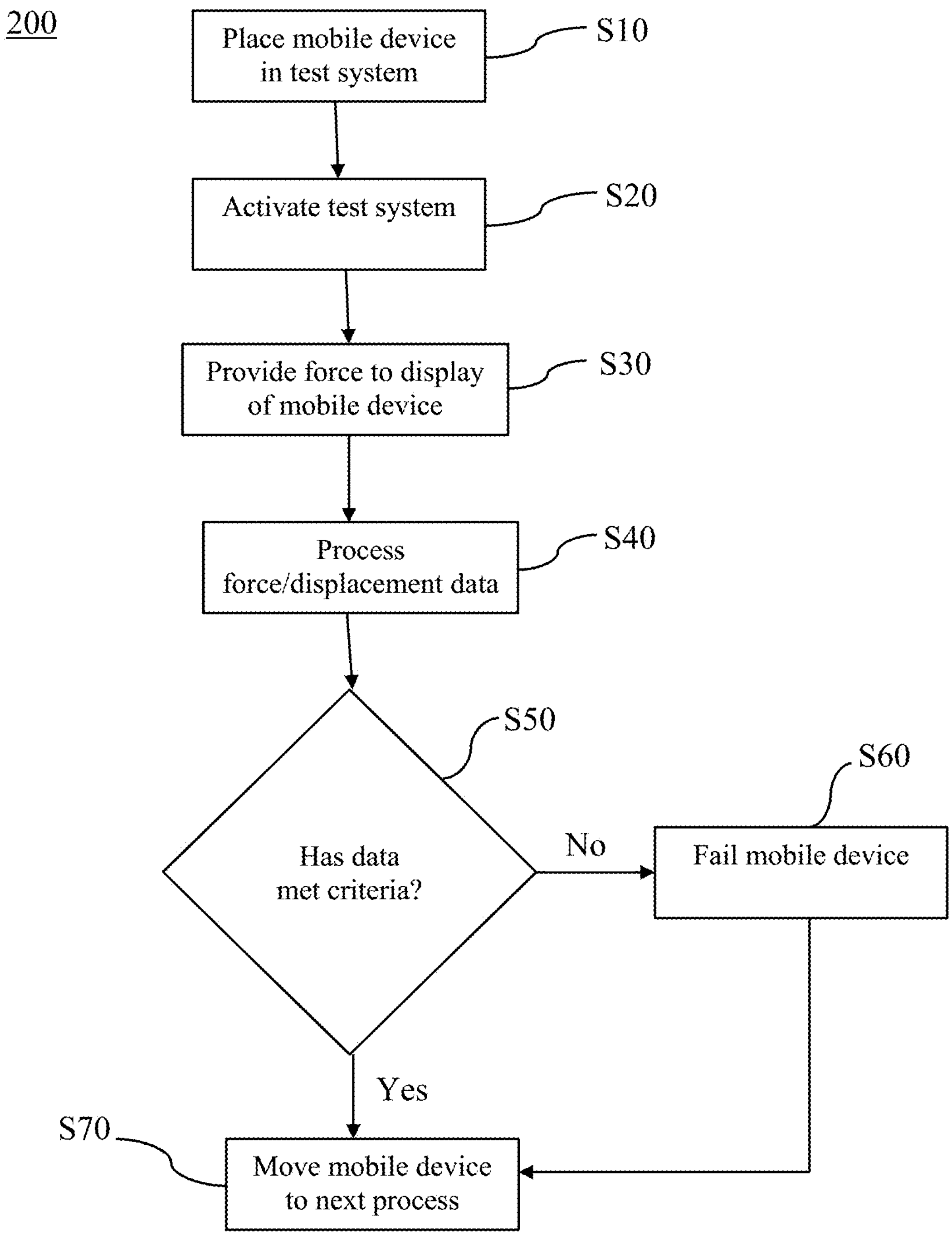
FIG. 5 is a flow chart of a method, according to an embodiment of the present disclosure.

FIG. 5 is a flowchart of a method 200 of evaluating a mobile device, according to an embodiment of the present disclosure.

In step S10, a mobile device is placed in a test system. The test system can be like that shown and described with respect to FIG. 1. The mobile device can be placed in a fixture so that its display faces a pressing device.

In step S20, the test system is activated to provide a perpendicular force to an outer surface of the display of the mobile device under test. Activating the test system can include initiating movement of a motor or pressing device towards the display. For example, activating the test system can be performed by an operator who presses a physical or virtual 'start' button via a graphical user interface on a computer system.

In step S30, the test system provides a perpendicular force to the display by moving a motor or another pressing device to be in contact with the display and then continuing to apply pressure. A sensor or sensors detects the distance that the motor travels after being in contact with the display, corresponding to a displacement or bending of the display, and the force required by the motor to achieve the displacement. In some embodiments, the force will stop being applied either when the motor reaches a maximum distance or a maximum force, which have been predetermined. In some embodiments, the maximum force can be held for some period of time (i.e., hold time) to gather compression data. This hold time can be determined by experimentation. For example, the hold time can be within a range of 200 msec to 1 sec. The motor or pressing device can return to its start position after the force has stopped being applied.

In step S40, the force and displacement data is processed by a computer system as part of the test system. In some embodiments, processing the data can include determining the force and displacement distance over the duration of the test and comparing those values to predetermined values or thresholds. The data collected can be plotted and displayed on the computer system as a graph similar to that shown in FIGS. 2 and 3. A slope of the force-displacement curve can be used as a pass/fail criterion. In some embodiments, processing the data can include determining the force and displacement distance over the duration of the test, calculating offset, deflection, and compression, and feeding those calculated values into the ML model. The data collected can be plotted and displayed on the computer system as a graph similar to that shown in FIG. 4. Threshold values and/or pass/fail criteria can be determined by experimentation of known good or failed mobile devices or learned by the ML model. The data can be stored in record of a memory associated with the unique mobile device under test.

In step S50, it is determined if force applied and/or deflection of the display of the mobile device under test has met the predetermined pass/fail criteria. If not, the mobile device is designated as failing the test in step S60 and can be moved to the next process step in step S70.

If in step S50 the test data has met the criteria in, the mobile device has passed the test and can be moved to the next process step in step S70.

In step S70, the mobile device can be moved to a next process based on the results of the evaluation. Depending on whether the mobile device has passed or failed the test, the next process can include processes such as scrap, rework/repair, continued evaluation, or refurbishment.

The above-described embodiments of the present disclosure can be implemented in any of numerous ways. For example, the embodiments can be implemented using hardware, software, or a combination thereof. When implemented in software, the software code can be executed on any suitable computer, processor, or collection of processors, whether provided in a single computer or distributed among multiple computers. Such processors can be implemented as integrated circuits, with one or more processors in an integrated circuit component. Though, a processor can be implemented using circuitry in any suitable format.

Additionally, or alternatively, the above-described embodiments can be implemented as a non-transitory computer readable storage medium embodied thereon a program executable by a processor that performs a method of various embodiments.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine. Typically, the functionality of the program modules can be combined or distributed as desired in various embodiments.

Also, the embodiments of the present disclosure can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A system of evaluating a mobile device, comprising:
a sensing device that captures data while a force is being applied to a display of the mobile device while the mobile device is held stationary;
a pressing device that applies the force perpendicular to an outer surface of the display; wherein
the pressing device is a linear motor; and
a processing device to process the data and determine the force applied and an amount of displacement of the display while the force is being applied.

2. The system of claim 1, wherein the sensing device captures data while the display is being displaced.

3. The system of claim 1, wherein the processing device presents processed data as a graph of the force applied versus displacement of the display while the force is being applied.

4. The system of claim 1, wherein the processing device compares processed data to predetermined values that represent pass/failure criteria of the mobile device.

5. The system of claim 1, wherein a comparison of the difference between the amount of the displacement of the display and a predetermined value determines if the display has shifted an unacceptable amount with respect to a frame of the mobile device.

6. A method of evaluating an environmental seal of a mobile device, the method comprising:

capturing data of a force applied to a display of the mobile device and displacement of the display while the force is applied;

wherein capturing the data is performed by sensing device attached to a linear motor; and processing the data to determine if the mobile device is leaking.

7. The method of claim 6, wherein the processing the data includes:

calculating, based on the captured force and displacement data, at least one of:

(i) an offset corresponding to a distance traveled by the linear motor from a start position to an inflection force indicating contact with the display, (ii) a deflection corresponding to an amount of displacement of the display until a predetermined maximum force is reached, and (iii) a compression corresponding to an amount of additional displacement of the display after the maximum force is reached; and feeding at least one of calculated offset, deflection, and compression values into a machine learning model.

8. The method of claim 6, wherein the linear motor applies the force in a direction perpendicular to an outer surface of the display.

9. The method of claim 8, wherein a computer system in communication with the linear motor processes the data.

10. The method of claim 6, wherein the processing the data includes plotting the force applied versus the displacement.

11. The method of claim 10, wherein the processing the data further includes comparing a slope of a curve of the force applied versus the displacement to a predetermined value.

* * * * *